United States Patent
Tu et al.

(10) Patent No.: US 12,441,293 B2
(45) Date of Patent: Oct. 14, 2025

(54) DYNAMIC CONTROL SYSTEM AND METHOD FOR POWER OF VEHICLE

(71) Applicant: Xiamen Yaxon Zhilian Technology Co., Ltd., Fujian (CN)

(72) Inventors: Yankai Tu, Fujian (CN); Junfang Lai, Fujian (CN); Weibin Chi, Fujian (CN); Xuhui Ye, Fujian (CN)

(73) Assignee: Xiamen Yaxon Zhilian Technology Co., Ltd., Fujian (CN)

( * ) Notice: Subject to any disclaimer, the term of this patent is extended or adjusted under 35 U.S.C. 154(b) by 268 days.

(21) Appl. No.: 18/250,285

(22) PCT Filed: Jul. 29, 2021

(86) PCT No.: PCT/CN2021/109236
§ 371 (c)(1),
(2) Date: Apr. 24, 2023

(87) PCT Pub. No.: WO2022/083208
PCT Pub. Date: Apr. 28, 2022

(65) Prior Publication Data
US 2024/0017712 A1    Jan. 18, 2024

(30) Foreign Application Priority Data

Oct. 22, 2020   (CN) .......................... 202011140952.5

(51) Int. Cl.
*B60W 20/12*   (2016.01)
*B60W 10/06*   (2006.01)
*B60W 10/08*   (2006.01)

(52) U.S. Cl.
CPC ............ *B60W 20/12* (2016.01); *B60W 10/06* (2013.01); *B60W 10/08* (2013.01);
(Continued)

(58) Field of Classification Search
CPC ..... F02D 11/105; B60W 10/06; B60W 10/08; B60W 20/10; B60W 20/12; B60W 20/15;
(Continued)

(56) References Cited

U.S. PATENT DOCUMENTS

2003/0182046 A1* 9/2003 Nada .................... B60W 10/10
                                                      180/170
2005/0257977 A1* 11/2005 Kamiya ................... B60L 3/04
                                                      180/171
(Continued)

FOREIGN PATENT DOCUMENTS

CN         103221276 A      7/2013
CN         104071152 A  * 10/2014 ........... B60W 10/06
(Continued)

OTHER PUBLICATIONS

International Search Report cited in PCT/CN2021/109236 mailed Nov. 3, 2021, 6 pages.
(Continued)

*Primary Examiner* — Fadey S. Jabr
*Assistant Examiner* — Mario C Gonzalez
(74) *Attorney, Agent, or Firm* — Cooper Legal Group, LLC

(57) ABSTRACT

The present disclosure discloses a dynamic control system and method for power of a vehicle. The system includes: an electronic horizon system, configured to obtain slope information and to send the slope information to a power controller; an accelerator pedal, configured to output accelerator pedal depth information to the power controller; and the power controller, configured to fit a power output curve for entering a next slope, and to control an engine or a motor of the vehicle to output a torque according to the power output curve. The present disclosure can generate the power output curve for a next road segment in real time.

5 Claims, 3 Drawing Sheets

(52) U.S. Cl.
CPC ..... *B60W 2540/10* (2013.01); *B60W 2552/15* (2020.02); *B60W 2710/0666* (2013.01); *B60W 2710/083* (2013.01)

(58) Field of Classification Search
CPC ....... B60W 30/188; B60W 2050/0026; B60W 2540/12; B60W 2552/15; B60W 2710/0666; B60W 2710/083; B60L 15/20; B60L 2240/642; B60L 2250/26; B60L 2250/28
See application file for complete search history.

(56) References Cited

U.S. PATENT DOCUMENTS

2017/0101098 A1\* 4/2017 Gibson ................. B60W 30/18
2021/0252983 A1\* 8/2021 Nahrwold ............... B60L 58/12

FOREIGN PATENT DOCUMENTS

| CN | 104822920 A | | 8/2015 | |
|----|----|----|----|----|
| CN | 107150687 A | | 9/2017 | |
| CN | 110154784 A | | 8/2019 | |
| CN | 111645666 A | | 9/2020 | |
| DE | 10210795 A1 | \* | 10/2003 | ............ B60W 10/06 |
| EP | 1640234 A1 | | 3/2006 | |
| WO | 2019121624 A1 | | 6/2019 | |

OTHER PUBLICATIONS

Written Opinion cited in PCT/CN2021/109236 mailed Nov. 3, 2021, 6 pages.

\* cited by examiner

DYNAMIC CONTROL SYSTEM AND METHOD FOR POWER OF VEHICLE

TECHNICAL FIELD

The present disclosure relates to the technical field of vehicle control, in particular to a dynamic control system and method for power of a vehicle.

BACKGROUND

Power output characteristics of a vehicle are generally determined by a power output curve, which is a function curve with an accelerator pedal stepping-on depth as a variable and a torque output by an engine or a motor as an output. In general, the power output curve of the vehicle is fixed, and some high-end car models may have a plurality of power output curves. For example, in a Chinese patent CN201710288538.0, a control system is provided, where a plurality of power output curves are pre-stored and correspond to the most suitable terrain, different situations such as ordinary ground, muddy ground, snow, and sand ahead of a vehicle are recognized by using an artificial intelligence method, and a power output curve of the vehicle is switched to corresponding different power output curves, to achieve the adaptability of the vehicle to different roads and the better economy or comfort. In this kind of method, characteristics are generally pre-stored in a plurality of fixed curves, and external environments are roughly classified and correspond to them. The number of pre-stored fixed curves is generally limited, and the actual external environments vary widely, so that the external environments can only be roughly classified and cannot be precisely matched during matching in major types, and the adaptability is also limited.

SUMMARY

To solve the technical problems in the prior art, the present disclosure provides a dynamic control system and method for power of a vehicle, which can generate a power output curve for a next road segment in real time according to an electronic horizon system and accelerator pedal depth information of a vehicle, thereby ensuring smooth driving of a driver, and making the vehicle more adaptive to different terrains.

To solve the technical problems, the present disclosure adopts the following technical solutions: a dynamic control system for power of a vehicle includes:

an electronic horizon system, configured to obtain geographic slope information of a road ahead of a vehicle based on an advanced driver assistance system (ADAS) map and to send the geographic slope information to a power controller;

an accelerator pedal, configured to output accelerator pedal depth information to the power controller; and the power controller, configured to receive the geographic slope information sent by the electronic horizon system and the accelerator pedal depth information sent by the accelerator pedal, to fit out a power output curve, with an accelerator pedal depth as an abscissa and an output torque as an ordinate, for entering a next slope in the road ahead according to the geographic slope information and the accelerator pedal depth information and perform switching, and to control an engine/a motor of the vehicle to output the torque according to the power output curve.

As a preferred solution of the present disclosure, the power controller includes a power output curve generation module; and the power output curve generation module includes:

a first key point obtaining unit, configured to obtain a first key point for fitting the power output curve, where the first key point is a point where the vehicle runs on a slope, and when the vehicle runs on the first key point, a same accelerator change depth as that on a flat road is capable of being used to obtain a same acceleration as that when running on the flat road;

a second key point obtaining unit, configured to obtain a second key point for fitting the power output curve, where the second key point is a point for maximizing an accelerator pedal depth, or the second key point is a point for maximizing the output torque;

a third key point obtaining unit, configured to obtain a third key point for fitting the power output curve, where the third key point is a point obtained according to a linear curve for flat-road running before the vehicle enters the slope;

a fourth key point obtaining unit, configured to obtain a fourth key point for fitting the power output curve, where the fourth key point is a zero point (0, 0), that is, the accelerator pedal depth is 0, and the output torque is 0; and a fitting unit, configured to fit out the power output curve based on the first key point, the second key point, the third key point, and the fourth key point.

As a preferred solution of the present disclosure, coordinates of the first key point are expressed as (A1·30·D, T1+ΔT+mg sin(i)), where T1 represents a torque, corresponding to an accelerator pedal depth A1, on the linear curve for flat-road running; ΔT represents a torque increment, corresponding to an accelerator pedal depth change intensity D, on the linear curve for flat-road running; i represents a front slope output by the electronic horizon system; m represents the mass of the vehicle; and g represents a gravitational acceleration.

As a preferred solution of the present disclosure, the power controller further includes an accelerator change intensity generation module; and the accelerator change intensity generation module is configured to obtain the accelerator pedal depth change intensity D, and specifically includes:

a monotonic interval obtaining unit, configured to continuously acquire an accelerator pedal depth signal during flat-road running, to determine the monotonicity of the signal, and to extract continuous monotonically increasing or decreasing intervals;

a monotonic interval filtering unit, configured to filter the monotonic intervals with the number of greater than a first preset value or smaller than a second preset value;

an absolute value obtaining unit, configured to obtain an absolute value of a difference between a first value and a final value of each of the monotonic intervals, to serve as a primary accelerator pedal depth change intensity; and an average accelerator change intensity obtaining unit, configured to determine whether the number of accelerator pedal depth change intensities obtained by the absolute value obtaining unit is greater than a third preset value, where if the number of accelerator pedal depth change intensities obtained by the absolute value obtaining unit is greater than the third preset value, an average value is calculated.

As a preferred solution of the present disclosure, if a front slope output by the electronic horizon system is greater than 0, coordinates of the second key point are expressed as (1−mg sin(i)/M, M); and if a front slope output by the electronic horizon system is smaller than 0, coordinates of the second key point are expressed as (1, M+mg sin(i)), where M represents a maximum torque that is capable of being output by the engine or the motor; i represents the front slope output by the electronic horizon system; m represents the mass of the vehicle; and g represents a gravitational acceleration.

As a preferred solution of the present disclosure, the power controller further includes a curve switching module; and the curve switching module is configured to switch a linear curve for flat-road running to the power output curve.

As a preferred solution of the present disclosure, the power controller further includes a torque output module; and the torque output module is configured to calculate a corresponding torque according to a current slope, a current accelerator pedal depth, and the power output curve, and to control the engine/motor of the vehicle to output the torque.

A dynamic control method for power of a vehicle includes:
obtaining, by an electronic horizon system, geographic slope information of a road ahead of a vehicle based on an ADAS map, and sending the geographic slope information to a power controller;
outputting, by an accelerator pedal, accelerator pedal depth information to the power controller;
receiving, by the power controller, the geographic slope information sent by the electronic horizon system and the accelerator pedal depth information sent by the accelerator pedal, fitting out a power output curve for entering a next slope according to the geographic slope information and the accelerator pedal depth information and performing switching, and controlling an engine/a motor of the vehicle to output a torque according to the power output curve, where an abscissa of the power output curve is an accelerator pedal depth, and an ordinate of the power output curve is the torque output by the engine/motor.

As a preferred solution of the present disclosure, the fitting out a power output curve for entering a next slope according to the geographic slope information and the accelerator pedal depth information includes:
obtaining a first key point for fitting the power output curve, where the first key point is a point where the vehicle runs on a slope, and when the vehicle runs on the first key point, a same accelerator change depth as that on a flat road is capable of being used to obtain a same acceleration as that when running on the flat road;
obtaining a second key point for fitting the power output curve, where the second key point is a point for maximizing the accelerator pedal depth, or the second key point is a point for maximizing the output torque;
obtaining a third key point for fitting the power output curve, where the third key point is a point obtained according to a linear curve for flat-road running before the vehicle enters the slope;
obtaining a fourth key point for fitting the power output curve, where the fourth key point is a zero point (0, 0), that is, the accelerator pedal depth is 0, and the output torque is 0; and
fitting out the power output curve based on the first key point, the second key point, the third key point, and the fourth key point.

As a preferred solution of the present disclosure, coordinates of the first key point are expressed as (A130 D, T1+ΔT+mg sin(i)), where T1 represents a torque, corresponding to an accelerator pedal depth A1, on the linear curve for flat-road running; ΔT represents a torque increment, corresponding to an accelerator pedal depth change intensity D, on the linear curve for flat-road running; i represents a front slope output by the electronic horizon system; m represents the mass of the vehicle; and g represents a gravitational acceleration;

if a front slope output by the electronic horizon system is greater than 0, coordinates of the second key point are expressed as (1−mg sin(i)/M, M); and if a front slope output by the electronic horizon system is smaller than 0, coordinates of the second key point are expressed as (1, M+mg sin(i)), where M represents a maximum torque that is capable of being output by the engine or the motor.

Due to the use of the above technical solutions, compared with the prior art, the present disclosure has the following beneficial effects:

According to the present disclosure, for different geographic slopes, a method for pre-storing a fixed power curve is not used, and the most suitable power output curve before entering the next slope is dynamically calculated according to a front terrain slope predicted by the electronic horizon system, the accelerator pedal depth (throttle opening) of the vehicle before entering the slope, and the average accelerator pedal depth change intensity of the driver in a historical journey, thereby ensuring that the driver, in different slope terrains, can obtain the same accelerated driving experience under the same accelerator pedal depth, ensuring smooth driving of the driver, facilitating the energy consumption economy of the vehicle, making the vehicle more adaptive to different terrains.

DESCRIPTION OF EMBODIMENTS

The technical solutions of the present disclosure are described in detail below with reference to the accompanying drawings and the embodiments.

EMBODIMENTS

Figure 1:
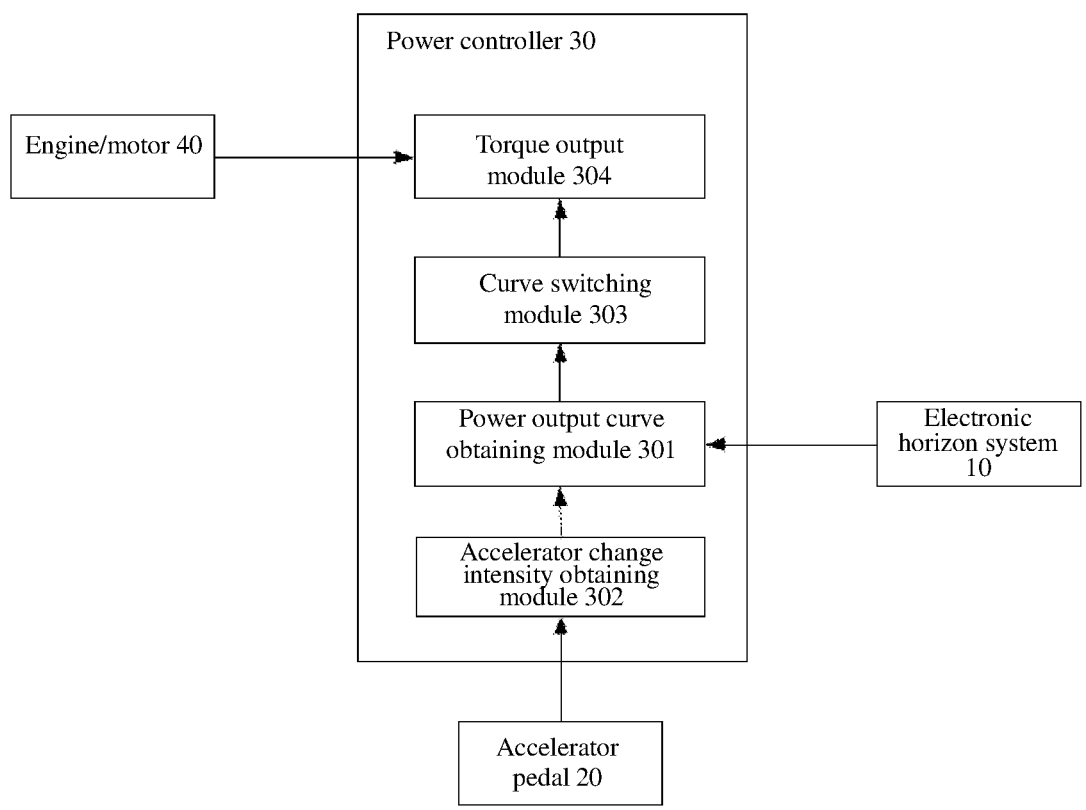
FIG. 1 is a structural block diagram of a dynamic control system for power of a vehicle according to the present disclosure.

As shown in FIG. 1, in one aspect, a dynamic control system for power of a vehicle according to the present disclosure includes:
an electronic horizon system 10, configured to obtain geographic slope information of a road ahead of a vehicle based on an ADAS map and to send the geographic slope information to a power controller 30;

an accelerator pedal 20, configured to output accelerator pedal depth information to the power controller 30; and the power controller 30, configured to receive the geographic slope information sent by the electronic horizon system 10 and the accelerator pedal depth information sent by the accelerator pedal 20, to fit out a power output curve, with an accelerator pedal depth as an abscissa and an output torque of an engine/a motor 40 as an ordinate, for entering a next slope in the road ahead according to the geographic slope information and the accelerator pedal depth information and perform switching, and to control the engine/motor 40 of the vehicle to output the torque according to the power output curve.

Further, the power controller 30 includes a power output curve generation module 301; and the power output curve generation module 301 includes:

a first key point obtaining unit, configured to obtain a first key point for fitting the power output curve, where the first key point is a point where the vehicle runs on a slope, and when the vehicle runs on the first key point, a same accelerator change depth as that on a flat road is capable of being used to obtain a same acceleration as that when running on the flat road;

a second key point obtaining unit, configured to obtain a second key point for fitting the power output curve, where the second key point is a point for maximizing an accelerator pedal depth, or the second key point is a point for maximizing the output torque;

a third key point obtaining unit, configured to obtain a third key point for fitting the power output curve, where the third key point is a point obtained according to a linear curve for flat-road running before the vehicle enters the slope;

a fourth key point obtaining unit, configured to obtain a fourth key point for fitting the power output curve, where the fourth key point is a zero point (0, 0), that is, the accelerator pedal depth is 0, and the output torque is 0; and a fitting unit, configured to fit out the power output curve based on the first key point, the second key point, the third key point, and the fourth key point.

In this embodiment, coordinates of the first key point are expressed as (A130 D, T1+ΔT+mg sin(i)), where T1 represents a torque, corresponding to an accelerator pedal depth A1, on the linear curve for flat-road running; ΔT represents a torque increment, corresponding to an accelerator pedal depth change intensity D, on the linear curve for flat-road running; i represents a front slope output by the electronic horizon system 10; m represents the mass of the vehicle; and g represents a gravitational acceleration.

The power controller 30 further includes an accelerator change intensity generation module 302; and the accelerator change intensity generation module 302 is configured to obtain the accelerator pedal depth change intensity D, and specifically includes:

a monotonic interval obtaining unit, configured to continuously acquire an accelerator pedal depth signal during flat-road running, to determine the monotonicity of the signal, and to extract continuous monotonically increasing or decreasing intervals;

a monotonic interval filtering unit, configured to filter the monotonic intervals with the number of greater than a first preset value or smaller than a second preset value;

an absolute value obtaining unit, configured to obtain an absolute value of a difference between a first value and a final value of each of the monotonic intervals, to serve as a primary accelerator pedal depth change intensity; and an average accelerator change intensity obtaining unit, configured to determine whether the number of accelerator pedal depth change intensities obtained by the absolute value obtaining unit is greater than a third preset value, where if the number of accelerator pedal depth change intensities obtained by the absolute value obtaining unit is greater than the third preset value, an average value is calculated.

In this embodiment, if a front slope output by the electronic horizon system 10 is greater than 0, coordinates of the second key point are expressed as (1−mg sin(i)/M, M); and if the front slope output by the electronic horizon system 10 is smaller than 0, the coordinates of the second key point are expressed as (1, M+mg sin(i)), where M represents a maximum torque that is capable of being output by the engine or the motor; i represents the front slope output by the electronic horizon system 10; m represents the mass of the vehicle; and g represents a gravitational acceleration.

Further, the power controller 30 further includes a curve switching module 303; and the curve switching module 303 is configured to switch a linear curve for flat-road running to the power output curve.

The power controller 30 further includes a torque output module 304; and the torque output module 304 is configured to calculate a corresponding torque according to a current slope, a current accelerator pedal depth, and the power output curve, and to control the engine/motor 40 of the vehicle to output the torque.

Figure 2:
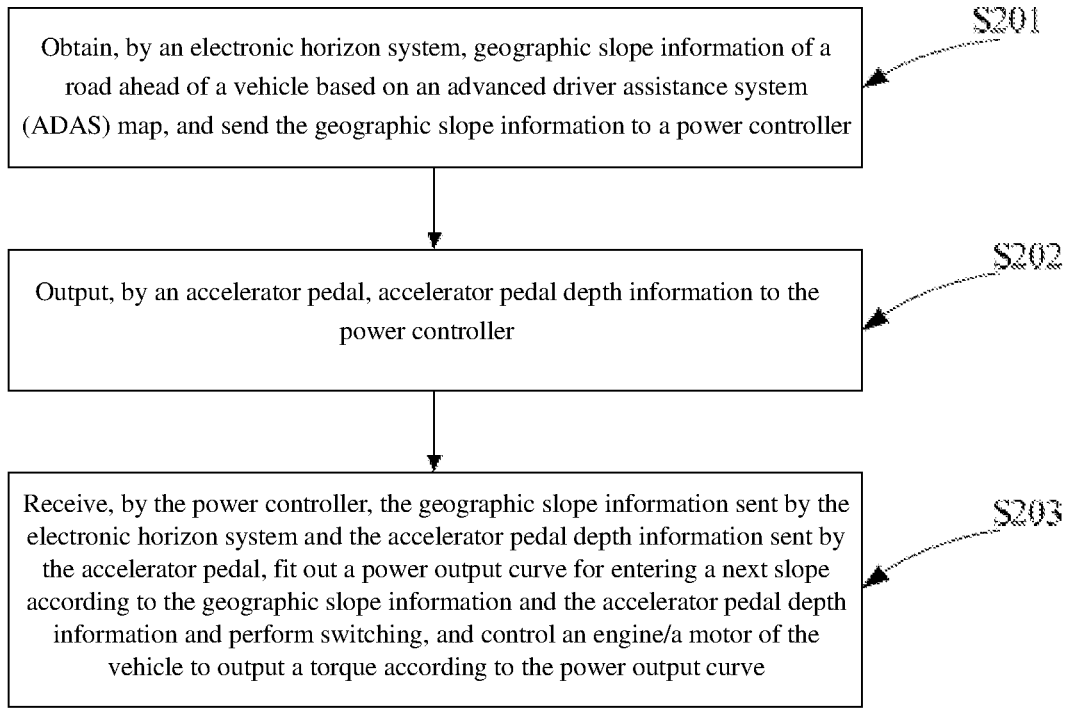
FIG. 2 is a flowchart of a dynamic control method for power of a vehicle according to the present disclosure.

As shown in FIG. 2, in another aspect, a dynamic control method for power of a vehicle according to the present disclosure includes:

S201: obtaining, by an electronic horizon system, geographic slope information of a road ahead of a vehicle based on an ADAS map and to send the geographic slope information to a power controller;

S202: outputting, by an accelerator pedal, accelerator pedal depth information to the power controller; and S203: receiving, by the power controller, the geographic slope information sent by the electronic horizon system and the accelerator pedal depth information sent by the accelerator pedal, fitting out a power output curve for entering a next slope according to the geographic slope information and the accelerator pedal depth information and performing switching, and controlling an engine/a motor of the vehicle to output a torque according to the power output curve, where an abscissa of the power output curve is an accelerator pedal depth, and an ordinate of the power output curve is the torque output by the engine/motor.

Figure 3:
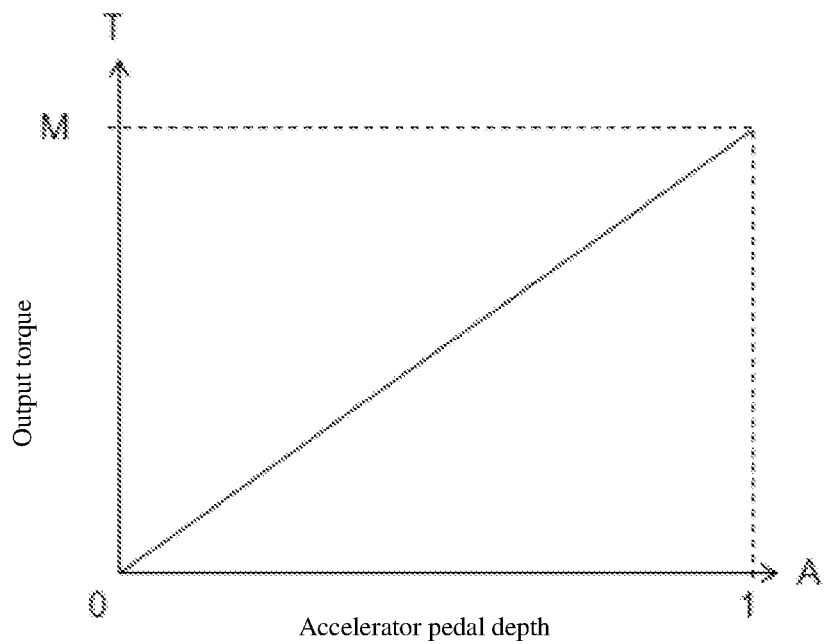
FIG. 3 is a schematic diagram of a power output curve when a vehicle according to the present disclosure is just started.

It should be noted that when the vehicle is just started, the power output curve of the vehicle is set as a default linear mode suitable for flat-road running. As shown in FIG. 3, if it is assumed that an output torque is T, an accelerator pedal depth is A, and a maximum torque that is capable of being output by the engine or the motor is M, a power output curve function (that is, the linear curve for flat-road running) is as follows:

$$T=M*A$$

where a value of A ranges from 0 to 1, 0 represents that an accelerator is not stepped on at all, and 1 represents that the accelerator is fully stepped on.

Figure 4:
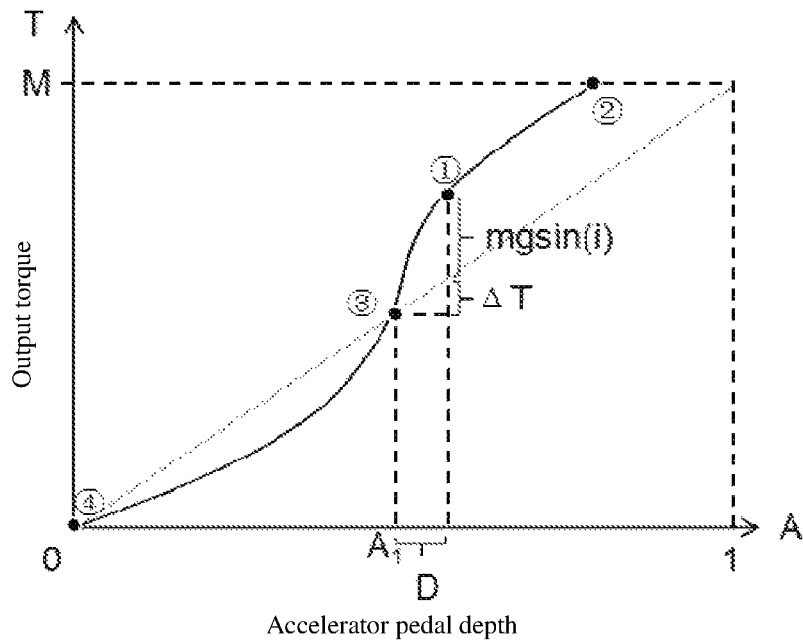
FIG. 4 is a schematic diagram of a power output curve output at an uphill road segment by a power curve generation module of a dynamic control system for power of a vehicle according to the present disclosure.
Figure 5:
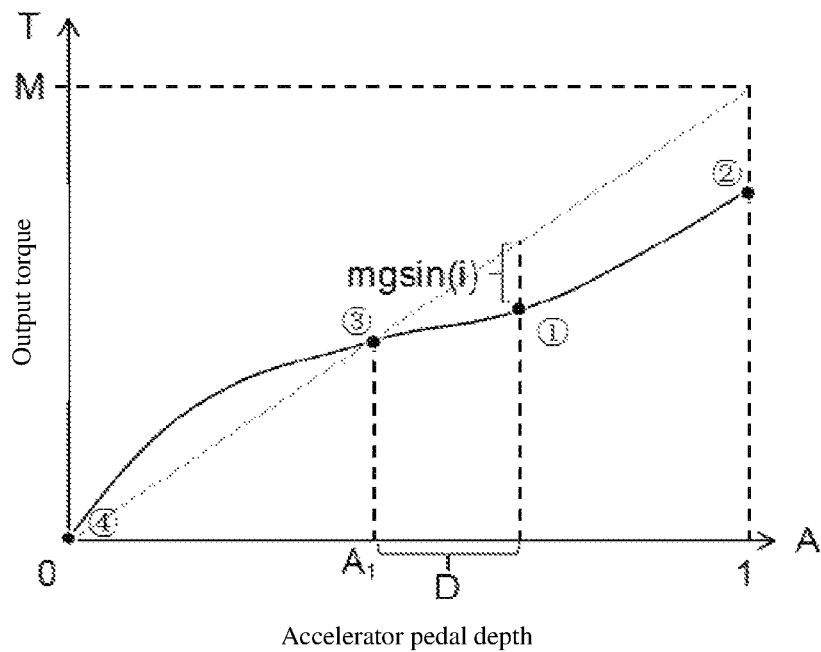
FIG. 5 is a schematic diagram of a power output curve output at a downhill road segment by a power curve generation module of a dynamic control system for power of a vehicle according to the present disclosure.

As shown in FIG. 4 and FIG. 5, in this embodiment, the step S203 specifically includes:

S2031: obtaining a front slope i from the electronic horizon system; and obtaining an accelerator pedal depth set as A1 before entering a slope.

S2032: obtaining a first key point, that is a point ① as shown in FIG. 4. The meaning of the first key point is that it is required to maintain the same driving performance as that on a flat road on the slope i, that is, an acceleration that can be obtained by the vehicle due to an accelerator pedal depth change on the slope is equal to an acceleration obtained by the same accelerator pedal depth change on the flat road. In this way, the driving experience and the driving stability can be ensured.

On the slope i, according to a flat road statistics habit, during acceleration of a driver, generally a vehicle accelerator change is set as D (an accelerator pedal depth change intensity), and a corresponding torque change is set as $\Delta T'$, so that an obtained acceleration is $a'=\Delta T'/m-g\sin(i)$, where m is the mass of the vehicle, and g is a gravitational acceleration. It may be seen that when i>0, that is, when the vehicle goes uphill, the acceleration under the same accelerator will decrease, while when i<0, that is, when the vehicle goes downhill, the acceleration under the same accelerator will increase.

On the flat road, a vehicle accelerator change is D, a corresponding torque change is $\Delta T$, and an acceleration obtained by the vehicle is $a'=\Delta T/m$.

To make a=a', that is, $\Delta T'/m-g\sin(i)=\Delta T/m$, $\Delta T'=\Delta T+mg\sin(i)$ may be obtained.

It may be seen from the above that when the accelerator change increases by D relative to a current value, the torque change should be $\Delta T+mg\sin(i)$, so that it can be ensured that the driver obtains the same driving experience as that on the flat road when running on the slope i. That is, on the basis of obtaining an increment value $\Delta T$ corresponding to the accelerator change D in an original power curve (i.e., a linear curve for flat-road running, and the linear curve is a default curve), a force of $mg\sin(i)$ needs to be superimposed.

Therefore, coordinates $(A130 D, T1+\Delta T+mg\sin(i))$ of the first key point of the power output curve are obtained, where T1 represents a torque, corresponding to an accelerator pedal depth A1, on the original power curve, and $\Delta T$ is a torque increment, corresponding to the vehicle accelerator change D, on the original power curve.

S2033: obtaining a second key point, that is a point ② as shown in FIG. 4. When the accelerator change after the first key point continues increasing, a linear change about the same as a slope of a flat-road mode should be maintained, so that the same driving experience as that in the flat-road mode can continue being maintained. The slope of the flat-road mode is M equal to a vertical axis divided by a horizontal axis, and (M−0)/(1−0)=M, so that the second half of the power output curve is obtained as follows:

$$T=M*A+mg\sin(i) \quad (1)$$

When $mg\sin(i)<=0$, A=1 is substituted into the formula (1) to calculate a corresponding vertical axis T value, and coordinates $(1, M+mg\sin(i))$ of the second key point are obtained; or otherwise, T=M is substituted into the formula (1) to calculate a corresponding horizontal axis A value, and coordinates $(1-mg\sin(i)/M, M)$ of the second key point are obtained.

S2034: obtaining a third key point, that is a point ③ as shown in FIG. 4. The third key point is the accelerator pedal depth and the torque (A1, T1) on the original power curve before entering the slope.

S2035: obtaining a fourth key point, that is a point ④ as shown in FIG. 4. The fourth key point is (0, 0), that is, when the accelerator pedal depth is maintained to be 0, the output torque is 0.

S2036: fitting out the power output curve based on the first key point, the second key point, the third key point, and the fourth key point by third-order curve fitting or other curve fitting manners.

FIG. 4 is an example of a real-time power output curve for going uphill (the slope i>0). It may be seen that when the power output curve is switched, the vehicle runs on the third key point, without suddenly changing the power situation and affecting the driving smoothness. When the driver steps on the accelerator to obtain the acceleration, and the high-probability habitual accelerator change point D is reached, the acceleration obtained when going uphill is the same as that on the flat road, which facilitates the driver to maintain a consistent driving feeling, avoids the problem of excessive fuel consumption of transmission downshift possibly due to insufficient acceleration at the habitual accelerator depth on the flat road, and objectively has certain economical efficiency.

FIG. 5 is an example of a real-time power output curve for going downhill (the slope i<0). It may be seen that when the power output curve is switched, the vehicle runs on the third key point, without suddenly changing the power situation and affecting the driving smoothness. When the driver steps on the accelerator to obtain the acceleration, and the high-probability habitual accelerator change point D is reached, the acceleration obtained when going downhill is the same as that on the flat road, and the output torque is reduced, so that the fuel consumption is reduced under the condition of maintaining the consistent driving feeling. Meanwhile, when the accelerator is stepped on to the maximum, the acceleration obtained is the same, but the maximum torque will not be output, thereby ensuring the economical efficiency.

In this embodiment, a method for obtaining an average accelerator pedal depth change intensity D of the vehicle includes:

Step one: continuously acquiring an accelerator pedal depth signal during flat-road running from the electronic horizon system, determining the monotonicity of the signal, and extracting continuous monotonically increasing or decreasing intervals.

Step two: filtering too short and too long monotonic intervals (two ends of each of the intervals may be set to be a first preset value and a second preset value), to eliminate the volatility and slow trend effects of human operation.

Step three: obtaining an absolute value of a difference between a first value and a final value of each of the monotonic intervals, to serve as a primary accelerator pedal depth change intensity.

Step four: when the number of extracted accelerator change intensities reaches a lower limit K (i.e., a third preset value, and K is not less than 100), calculating the average accelerator pedal depth change intensity D, where D represents an average acceleration or deceleration habit of the driver on the flat road.

The above are only the preferred embodiments of the present disclosure and are not intended to limit the present disclosure in any form. Although the present disclosure has been disclosed with the preferred embodiments as above, the preferred embodiments are not intended to limit the present disclosure. Any of those skilled in the art may make many possible changes and modifications to the technical solutions of the present disclosure by using the technical content disclosed above, or modify them to equivalent embodiments without departing from the scope of the technical solutions of the present disclosure. Therefore, any simple amendments, equivalent changes and modifications made to the above embodiments according to the technical essence of the present disclosure without departing from the content of the technical solutions of the present disclosure fall within the scope of protection of the technical solutions of the present disclosure.

INDUSTRIAL APPLICABILITY

In a dynamic control system and method for power of a vehicle according to the present disclosure, geographic slope information of a road ahead is obtained by using an electronic horizon system, a power output curve for a next road segment is generated in real time according to the geographic slope information of the electronic horizon system and accelerator pedal depth information of a vehicle, and an engine/a motor of the vehicle is controlled to output a torque according to the power output curve; and such a method for obtaining the most suitable power output curve before entering a next slope through dynamic calculation to implement dynamic control of the power of the vehicle can ensure smooth driving of a driver, facilitate the energy consumption economy of the vehicle, and make the vehicle more adaptive to different terrains. The electronic horizon system is a database system that may provide the vehicle with accurate real-time information of the road ahead, and the geographic slope information of the road ahead can be accurately obtained by the electronic horizon system; and the present disclosure is convenient to implement in industry with the aid of the electronic horizon system and a vehicle-mounted device, and various components such as a power controller and an accelerator pedal are also convenient to process in industry.

The invention claimed is:

1. A dynamic control system for power of a vehicle, comprising:
    an accelerator pedal, configured to output accelerator pedal depth information to a power controller; and
    the power controller, configured to receive geographic slope information of a road ahead of the vehicle based on an advanced driver assistance system (ADAS) map and the accelerator pedal depth information sent by the accelerator pedal, to fit out a power output curve, with an accelerator pedal depth as an abscissa and an output torque as an ordinate, for entering a next slope in the road ahead according to the geographic slope information and the accelerator pedal depth information and perform switching, and to control at least one of an engine or a motor of the vehicle to output torque according to the power output curve;
    wherein the power controller comprises a power output curve generation module; and the power output curve generation module comprises:
        a first key point obtaining unit, configured to obtain a first key point for fitting the power output curve, wherein the first key point is a point where the vehicle runs on a slope, and when the vehicle runs on the first key point, a same accelerator change depth as that on a flat road is configured to be used to obtain a same acceleration as that when running on the flat road;
        a second key point obtaining unit, configured to obtain a second key point for fitting the power output curve, wherein the second key point is a point for maximizing the accelerator pedal depth, or the second key point is a point for maximizing the output torque;
        a third key point obtaining unit, configured to obtain a third key point for fitting the power output curve, wherein the third key point is a point obtained according to a linear curve for flat-road running before the vehicle enters the slope;
        a fourth key point obtaining unit, configured to obtain a fourth key point for fitting the power output curve, wherein the fourth key point is a zero point (0, 0), that is, the accelerator pedal depth is 0, and the output torque is 0; and
        a fitting unit, configured to fit out the power output curve based on the first key point, the second key point, the third key point, and the fourth key point;
    wherein coordinates of the first key point are expressed as $(A1+D, T1+\Delta T+mg \sin(i))$, wherein $T1$ represents a torque, corresponding to an accelerator pedal depth $A1$, on the linear curve for flat-road running; $\Delta T$ represents a torque increment, corresponding to an accelerator pedal depth change intensity $D$, on the linear curve for flat-road running; $i$ represents a front slope; $m$ represents a mass of the vehicle; and $g$ represents a gravitational acceleration;
    wherein the power controller further comprises an accelerator change intensity generation module; and the accelerator change intensity generation module is configured to obtain the accelerator pedal depth change intensity $D$, and specifically comprises:
        a monotonic interval obtaining unit, configured to continuously acquire an accelerator pedal depth signal during flat-road running, to determine monotonicity of the accelerator pedal depth signal, and to extract continuous monotonically increasing or decreasing intervals;
        a monotonic interval filtering unit, configured to filter monotonic intervals with a number of greater than a first preset value or smaller than a second preset value;
        an absolute value obtaining unit, configured to obtain an absolute value of a difference between a first value and a final value of each of the monotonic intervals, to serve as a primary accelerator pedal depth change intensity; and
        an average accelerator change intensity obtaining unit, configured to determine whether a number of accelerator pedal depth change intensities obtained by the absolute value obtaining unit is greater than a third preset value, wherein when the number of acceleraabsolute value obtaining unit is greater than the third preset value, an average value is calculated.

2. The dynamic control system for power of a vehicle according to claim 1, wherein when the front slope is greater than 0, coordinates of the second key point are expressed as (1−mg sin(i)/M, M); and when the front slope is smaller than 0, coordinates of the second key point are expressed as (1, M+mg sin(i)), wherein M represents a maximum torque that is configured to be output by the at least one of the engine or the motor.

3. The dynamic control system for power of a vehicle according to claim 1, wherein the power controller further comprises a curve switching module; and the curve switching module is configured to switch the linear curve for flat-road running to the power output curve.

4. The dynamic control system for power of a vehicle according to claim 1, wherein the power controller further comprises a torque output module; and the torque output module is configured to calculate a corresponding torque according to a current slope, a current accelerator pedal depth, and the power output curve, and to control the at least one of the engine or the motor of the vehicle to output the torque.

5. A dynamic control method for power of a vehicle by using the dynamic control system according to claim 1, the method comprising:
 obtaining the geographic slope information of the road ahead of the vehicle based on the ADAS map, and sending the geographic slope information to the power controller;
 outputting, by the accelerator pedal, the accelerator pedal depth information to the power controller; and
 receiving, by the power controller, the geographic slope information and the accelerator pedal depth information sent by the accelerator pedal, fitting out the power output curve for entering the next slope according to the geographic slope information and the accelerator pedal depth information and performing switching, and controlling the at least one of the engine or the motor of the vehicle to output the torque according to the power output curve, wherein the abscissa of the power output curve is the accelerator pedal depth, and the ordinate of the power output curve is the torque output by the at least one of the engine or the motor.

* * * * *